US012723346B2

(12) United States Patent
Thakur et al.

(10) Patent No.: US 12,723,346 B2
(45) Date of Patent: Sep. 1, 2026

(54) COATED POLYESTER FABRIC

(71) Applicant: Dow Global Technologies LLC, Midland, MI (US)

(72) Inventors: Varun Thakur, Horgen (CH); Stefan Ultsch, Horgen (CH); Miguel A. Prieto, Horgen (CH); Burcak Conley, Zurich (CH); Jozef J.I. Van Dun, Horgen (CH)

(73) Assignee: Dow Global Technologies LLC, Midland, MI (US)

( * ) Notice: Subject to any disclaimer, the term of this patent is extended or adjusted under 35 U.S.C. 154(b) by 251 days.

(21) Appl. No.: 18/741,254

(22) Filed: Jun. 12, 2024

(65) Prior Publication Data

US 2024/0410108 A1 Dec. 12, 2024

Related U.S. Application Data

(63) Continuation of application No. 16/336,407, filed as application No. PCT/US2017/051974 on Sep. 18, 2017, now abandoned.

(60) Provisional application No. 62/400,816, filed on Sep. 28, 2016.

(51) Int. Cl.

| | |
|---|---|
| ***D06M 15/273*** | (2006.01) |
| ***B32B 5/02*** | (2006.01) |
| ***B32B 7/12*** | (2006.01) |
| ***B32B 27/12*** | (2006.01) |
| ***B32B 27/20*** | (2006.01) |
| ***B32B 27/32*** | (2006.01) |
| ***C08K 3/013*** | (2018.01) |
| ***C09D 123/08*** | (2006.01) |
| ***C09D 131/04*** | (2006.01) |
| ***C09J 123/08*** | (2006.01) |
| ***C09J 133/06*** | (2006.01) |
| ***D06B 1/14*** | (2006.01) |
| ***D06M 15/227*** | (2006.01) |
| ***D06M 15/263*** | (2006.01) |
| ***D06M 15/277*** | (2006.01) |
| ***D06M 15/333*** | (2006.01) |
| ***D06M 17/06*** | (2006.01) |
| ***D06M 101/32*** | (2006.01) |
| ***D06N 3/04*** | (2006.01) |
| ***D06N 3/18*** | (2006.01) |

(52) U.S. Cl.

CPC ............ *D06M 15/273* (2013.01); *B32B 5/02* (2013.01); *B32B 7/12* (2013.01); *B32B 27/12* (2013.01); *B32B 27/20* (2013.01); *B32B 27/32* (2013.01); *D06B 1/14* (2013.01); *D06M 15/227* (2013.01); *D06M 15/263* (2013.01); *D06M 15/277* (2013.01); *D06M 15/333* (2013.01); *D06M 17/06* (2013.01); *D06N 3/04* (2013.01); *D06N 3/042* (2013.01); *D06N 3/045* (2013.01); *D06N 3/183* (2013.01); *B32B 2262/0276* (2013.01); *C08K 3/013* (2018.01); *C09D 123/0815* (2013.01); *C09D 131/04* (2013.01); *C09J 123/0869* (2013.01); *C09J 133/068* (2013.01); *D06B 2700/02* (2013.01); *D06M 2101/32* (2013.01)

(58) Field of Classification Search

None

See application file for complete search history.

(56) References Cited

U.S. PATENT DOCUMENTS

| | | | |
|---|---|---|---|
| 5,204,409 | A | 4/1993 | Arend et al. |
| 5,609,962 | A | 3/1997 | Ouhadi |
| 7,005,476 | B1 | 2/2006 | Terfloth et al. |
| 7,261,935 | B2 | 8/2007 | Hofmann |
| 7,608,668 | B2 | 10/2009 | Li Pi Shan et al. |
| 7,858,706 | B2 | 12/2010 | Arriola et al. |
| 7,893,166 | B2 | 2/2011 | Shan et al. |
| 7,947,793 | B2 | 5/2011 | Marchand et al. |
| 8,507,600 | B2 | 8/2013 | Kohlstruk et al. |
| 2002/0018860 | A1 | 2/2002 | Filippou et al. |
| 2002/0031964 | A1 | 3/2002 | Reisdorf et al. |
| 2003/0099840 | A1 | 5/2003 | Dey et al. |
| 2004/0115456 | A1 | 6/2004 | Kanderski et al. |
| 2004/0116022 | A1 | 6/2004 | Langley et al. |
| 2004/0121172 | A1 | 6/2004 | Hofmann |
| 2005/0106965 | A1 | 5/2005 | Wevers et al. |
| 2005/0109458 | A1 | 5/2005 | D'Herbecourt et al. |
| 2006/0252329 | A1 | 11/2006 | Nahmias et al. |
| 2007/0155900 | A1 | 7/2007 | Chang et al. |
| 2008/0241529 | A1 | 10/2008 | Bauer et al. |
| 2008/0289758 | A1 | 11/2008 | Krabbenborg et al. |
| 2009/0258252 | A1 | 10/2009 | December et al. |
| 2010/0029827 | A1 | 2/2010 | Ansems et al. |

(Continued)

FOREIGN PATENT DOCUMENTS

| | | |
|---|---|---|
| CN | 201841990 U | 5/2011 |
| JP | H08-217925 A | 8/1996 |

(Continued)

OTHER PUBLICATIONS

Lotader AX 89000.

SK Functional Polymer. Lotader AX9000 Technical Data Sheet, Mar. 2020.

*Primary Examiner* — Marla D Mcconnell
*Assistant Examiner* — Kevin Worrell
(74) *Attorney, Agent, or Firm* — Boyle Fredrickson S.C.

(57) ABSTRACT

The present disclosure provides and article. The article includes:

(A) a polyester fabric;

(B) a coating on a surface of the polyester fabric, the coating comprising at least one of (i) an ethylene/vinyl acetate/maleic anhydride terpolymer and (ii) an ethylene/methyl acrylate/glycidyl methacrylate terpolymer.

19 Claims, No Drawings

(56) References Cited

U.S. PATENT DOCUMENTS

| | | | |
|---|---|---|---|
| 2011/0123782 | A1 | 5/2011 | Teather et al. |
| 2011/0287204 | A1 | 11/2011 | Devisme et al. |
| 2013/0059163 | A1 | 3/2013 | Hofmann et al. |
| 2013/0210308 | A1 | 8/2013 | McEneany et al. |
| 2013/0236660 | A1 | 9/2013 | Niu et al. |
| 2014/0030495 | A1 | 1/2014 | Cartier et al. |
| 2015/0038629 | A1 | 2/2015 | Ultsch |
| 2017/0313021 | A1 | 11/2017 | Chakravarty et al. |
| 2018/0187040 | A1 | 7/2018 | Wan et al. |

FOREIGN PATENT DOCUMENTS

| | | | |
|---|---|---|---|
| TW | 1224119 | B | 11/2004 |
| WO | 00/59723 | A1 | 10/2000 |
| WO | 01/05588 | A1 | 1/2001 |
| WO | 2006/101932 | A2 | 9/2006 |

COATED POLYESTER FABRIC

FIELD

The present disclosure relates to an article formed from a coated polyester fabric, and further a polyester fabric adhered to a polyolefin substrate.

BACKGROUND

Polyester fabric, and closed mesh polyester fabric in particular, has numerous applications in textile architectures, tubing, packaging films, and wire and cable applications. Polyester fabric is conventionally coated with polyvinyl chloride (PVC) to strengthen the fabric and provide flame retardant properties. A need exists for a halogen-free alternative to PVC.

Polyolefins have been used as an alternative to PVC, but the low surface energy and low polarity of polyolefins greatly limit their applications when properties such as printing, painting or adhesion are required. Moreover, polyolefins, alone, do not provide flame retardant properties. A high load (40 wt % or more) of filler is typically added to the polyolefin to provide flame retardant properties. It is known that high load filler in polyolefin makes polyolefin adhesion to a polyester fabric more difficult.

Conventional methods to improve the adhesion and printability of polyolefins and polyester fabrics include surface modification by way of physical and chemical treatments. Such treatments include some methods such as solvent clean-up (or wiping), surface roughening by sand paper, acid treatment and base treatment, to some more sophisticated treatments such as plasma, corona and flame treatments. Some of these treatments lengthen processing time and require a more complicated processing method.

Conventional methods also include adhesive compositions including halogenated polyolefins, polyurethane, and/or water, but they are typically used at a thick coat weight (greater than 40 g/m$^2$) to improve adhesion.

A need exists for a halogen-free polyolefin-based coating layer for polyester fabric. A need further exists for a closed mesh polyester fabric coated with a filled polyolefin layer with strong adhesion between the fabric and the filled polyolefin layer without degradation to flexibility and flame retardancy.

SUMMARY

The present disclosure provides an article. The article includes:

(A) a polyester fabric;

(B) a coating on a surface of the polyester fabric, the coating comprising at least one of (i) an ethylene/vinyl acetate/maleic anhydride terpolymer and (ii) an ethylene/methyl acrylate/glycidyl methacrylate terpolymer.

The present disclosure provides another article. The article includes:

(A) a polyester fabric;

(B) an adhesive layer, the adhesive layer adhered to the polyester fabric and comprising at least one of (i) an ethylene/vinyl acetate/maleic anhydride terpolymer and (ii) an ethylene/methyl acrylate/glycidyl methacrylate terpolymer;

(C) an outer layer, the outer layer adhered to the adhesive layer and comprising an ethylene/α-olefin multi-block copolymer and a filler.

DEFINITIONS

Any reference to the Periodic Table of Elements is that as published by CRC Press, Inc., 1990-1991. Reference to a group of elements in this table is by the new notation for numbering groups.

For purposes of United States patent practice, the contents of any referenced patent, patent application or publication are incorporated by reference in their entirety (or its equivalent US version is so incorporated by reference) especially with respect to the disclosure of definitions (to the extent not inconsistent with any definitions specifically provided in this disclosure) and general knowledge in the art.

The numerical ranges disclosed herein include all values from, and including, the lower and upper value. For ranges containing explicit values (e.g., 1 or 2; or 3 to 5; or 6; or 7), any subrange between any two explicit values is included (e.g., 1 to 2; 2 to 6; 5 to 7; 3 to 7; 5 to 6; etc.).

Unless stated to the contrary, implicit from the context, or customary in the art, all parts and percents are based on weight and all test methods are current as of the filing date of this disclosure.

The term "composition" refers to a mixture of materials which comprise the composition, as well as reaction products and decomposition products formed from the materials of the composition.

The terms "comprising," "including," "having" and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term "consisting essentially of" excludes from the scope of any succeeding recitation any other component, step, or procedure, excepting those that are not essential to operability. The term "consisting of" excludes any component, step, or procedure not specifically delineated or listed. The term "or," unless stated otherwise, refers to the listed members individually as well as in any combination. Use of the singular includes use of the plural and vice versa.

An "ethylene-based polymer" or "ethylene polymer" is a polymer that contains a majority amount, or greater than 50 wt %, of polymerized ethylene based on the weight of the polymer, and, optionally, may comprise at least one comonomer.

An "ethylene/α-olefin interpolymer" is an interpolymer that contains a majority amount of polymerized ethylene, based on the weight of the interpolymer, and at least one α-olefin.

"Fabric" is a woven or non-woven (such as knitted) structure formed from individual fibers or yarn.

"Fiber" and like terms refer to an elongated column of entangled filaments.

"Filament" and like terms refer to a single, continuous strand of elongated material having generally round cross-section and a length to diameter ratio of greater than 10.

"Halogen-free" and like terms indicate that the compositions, layers, and/or articles are without, or substantially without, halogen content.

A "hydrocarbon" is a compound that contains only hydrogen and carbon atoms. The hydrocarbon can be (i) branched or unbranched, (ii) saturated or unsaturated (iii) cyclic or acyclic, and (iv) any combination if (i)-(iii). Nonlimiting examples of hydrocarbons include alkanes, alkenes, and alkynes.

An "interpolymer" (or "terpolymer") is a polymer prepared by the polymerization of at least two different types of monomers. The generic term interpolymer thus includes copolymers (employed to refer to polymers prepared from two different types of monomers), terpolymers (employed to refer to polymers prepared from three different types of monomers), and polymers prepared from more than three different types of monomers.

"Nonwoven" is a web or a fabric having a structure of individual fibers or threads which are randomly interlaid, but no in an identifiable manner as is the case of a knitted fabric.

An "olefin-based polymer" or "polyolefin" is a polymer that contains a majority amount, or greater than 50 wt %, of polymerized olefin monomer, for example, ethylene or propylene, (based on the weight of the polymer), and optionally, may contain at least one comonomer. Nonlimiting examples of an olefin-based polymer include an ethylene-based polymer and a propylene-based polymer.

A "polymer" is a polymeric compound prepared by polymerizing monomers, whether of the same or a different type. The generic term polymer thus embraces the term "homopolymer" (employed to refer to polymers prepared from only one type of monomer, with the understanding that trace amounts of impurities can be incorporated into the polymer structure), and the term "interpolymer." Trace amounts of impurities, for example, catalyst residues, may be incorporated into and/or within the polymer. It also embraces all forms of copolymer, e.g., random, block, etc. The terms "ethylene/α-olefin polymer" and "propylene/α-olefin polymer" are indicative of copolymer as described above prepared from polymerizing ethylene or propylene respectively and one or more additional, polymerizable α-olefin monomer. It is noted that although a polymer is often referred to as being "made of" one or more specified monomers, "based on" a specified monomer or monomer type, "containing" a specified monomer content, or the like, in this context the term "monomer" is understood to be referring to the polymerized remnant of the specified monomer and not to the unpolymerized species. In general, polymers herein are referred to has being based on "units" that are the polymerized form of a corresponding monomer.

"Yarn" is a continuous length of twisted or otherwise entangled filaments that can be used in the manufacture of woven or knitted fabrics.

DETAILED DESCRIPTION

The present disclosure provides an article. The article includes (A) a polyester fabric and (B) a coating on the surface of the polyester fabric. The (B) coating includes at least one of (i) an ethylene/vinyl acetate/maleic anhydride terpolymer and (ii) an ethylene/methyl acrylate/glycidyl methacrylate terpolymer. Optionally, the article includes (C) an outer layer. The optional (C) outer layer includes an olefin block copolymer that is an ethylene/α-olefin multi-block copolymer and a filler.

A. Polyester Fabric

The present article includes a polyester fabric. A "polyester fabric" is a woven or non-woven (such as knitted) structure formed from individual fibers or yarn, in which from greater than 50 wt %, or 75 wt % to 90 wt %, 99 wt %, or 100 wt % of the fibers or yarn are polyester fibers or polyester yarn. The polyester fabric may be an open mesh fabric or a closed mesh fabric.

In an embodiment, the polyester fabric is an open mesh fabric. An "open mesh fabric" is a nonwoven or woven structure formed from individual fibers or yarn, the fabric having apertures (i.e., holes) that each have an area greater than 10,000 $\mu m^2$, or from greater than 10,000 $\mu m^2$, or 50,000 $\mu m^2$, or 100,000 $\mu m^2$ to 1 $cm^2$, or 2 $cm^2$. Open mesh fabric excludes closed mesh fabric.

In an embodiment, the polyester fabric is a closed mesh fabric. A "closed mesh fabric" is a nonwoven or woven structure formed from individual fibers, the fabric having apertures (i.e., holes) that each have an area from 0 $\mu m^2$, or greater than 0 $\mu m^2$, or 1 $\mu m^2$, or 10 $\mu m^2$, or 50 $\mu m^2$, or 100 $\mu m^2$, or 500 $\mu m^2$ to 1,000 $\mu m^2$, or 5,000 $\mu m^2$, or less than 10,000 $\mu m^2$. Closed mesh fabric excludes open-mesh fabric. In an embodiment, the closed mesh polyester fabric is a woven close-mesh structure. A nonlimiting example of a woven close-mesh structure is a Panama weave, including a 2/2 weave in which the weft fiber, thread or yarn goes over two warp fibers, threads, or yarns and then under two warp fibers, threads, or yarns.

In an embodiment, the polyester fabric is a knitted fabric. A "knitted fabric" is formed from intertwining yarn or fibers in a series of connected loops either by hand, with knitting needles, or on a machine. The polyester fabric may be formed by warp or weft knitting, flat knitting, and circular knitting. Nonlimiting examples of suitable warp knits include tricot, raschel powernet, and lacing. Nonlimiting examples of suitable weft knits include circular, flat, and seamless (which is often considered a subset of circular knits).

A nonlimiting example of a suitable polyester is polyethylene terephthalate (PET). In an embodiment, the article includes a PET fabric. In a further embodiment, the article includes a closed mesh PET fabric. In a further embodiment, the article includes a closed mesh PET fabric having a woven close-mesh structure (such as a Panama weave).

The polyester fabric can be subjected to any finishing process, such as dying, pigmentation, bleaching, impregnating, decreasing flammability, or pretreatment with an adhesion or thermofixing agent.

In an embodiment, the polyester fabric is not subjected to any surface modification process prior to being coated with the present coating. Thus, the polyester fabric is not surface modified by physical or chemical treatments. Such treatments include solvent clean-up (or wiping); surface roughening by sand paper; acid treatment and base treatment; and plasma, corona and flame treatments. In an embodiment, the article includes an untreated closed mesh PET fabric having a woven close-mesh structure (such as a Panama weave).

In an embodiment, the polyester fabric has a thickness from 20 μm, or 50 μm, or 75 μm, or 100 μm, 150 μm, or 200 μm, or 250 μm, or 300 μm, or 350 μm, or 400 μm, or 450 μm to 500 μm, or 550 μm, or 600 μm, or 650 μm, or 700 μm, or 750 μm, or 800 μm, or 900 μm, or 1000 μm, or 1500 μm, or 2000 μm, or 3000 μm.

The polyester fabric may comprise two or more embodiments disclosed herein.

B. Coating

The present article includes a coating. The coating includes at least one of (i) an ethylene/vinyl acetate/maleic anhydride terpolymer and (ii) an ethylene/methyl acrylate/glycidyl methacrylate terpolymer. In an embodiment, the coating includes one of (i) an ethylene/vinyl acetate/maleic anhydride terpolymer or (ii) an ethylene/methyl acrylate/glycidyl methacrylate terpolymer.

(i) Ethylene/Vinyl Acetate/Maleic Anhydride Terpolymer

In an embodiment, the coating includes an ethylene/vinyl acetate/maleic anhydride terpolymer. An "ethylene/vinyl acetate/maleic anhydride terpolymer" or "EVA/MAH terpolymer" is an interpolymer that contains, in polymerized form, ethylene monomer, vinyl acetate comonomer, and maleic anhydride comonomer.

In an embodiment, the EVA/MAH terpolymer contains from 50 wt %, or 55 wt %, or 60 wt % to 65 wt %, or 70 wt %, or 75 wt %, or 80 wt %, or 85 wt % ethylene, based on the total weight of the EVA/MAH terpolymer.

In an embodiment, the EVA/MAH terpolymer contains from 15 wt %, or 20 wt %, or 25 wt %, or 26 wt % to 30 wt %, or 35 wt %, or 40 wt % vinyl acetate, based on the total weight of the EVA/MAH terpolymer.

In an embodiment, the EVA/MAH terpolymer contains from 0.1 wt %, or 0.5 wt %, or 0.6 wt % to 0.7 wt %, or 0.8 wt %, or 0.9 wt %, or 1.0 wt %, or 2 wt %, or 3 wt %, or 5 wt %, or 10 wt % maleic anhydride, based on the total weight of the EVA/MAH terpolymer.

In an embodiment, the EVA/MAH terpolymer contains (a) from 50 wt %, or 55 wt %, or 60 wt % to 65 wt %, or 70 wt %, or 75 wt %, or 80 wt %, or 85 wt % ethylene, (b) from 15 wt %, or 20 wt %, or 25 wt %, or 26 wt % to 30 wt %, or 35 wt %, or 40 wt % vinyl acetate, and (c) from 0.1 wt %, or 0.5 wt %, or 0.6 wt % to 0.7 wt %, or 0.8 wt %, or 0.9 wt %, or 1.0 wt %, or 2 wt %, or 3 wt %, or 5 wt %, or 10 wt % maleic anhydride, based on the total weight of the EVA/MAH terpolymer. In a further embodiment, the EVA/MAH terpolymer contains (a) from 69 wt %, or 69.36 wt % to 73.36 wt %, or 74 wt % ethylene, (b) from 26 wt % to 30 wt % vinyl acetate, and (c) 0.64 wt % maleic anhydride, based on the total weight of the EVA/MAH terpolymer.

In an embodiment, the EVA/MAH terpolymer has a density from 0.940 g/cc, or 0.945 g/cc, or 0.950 g/cc to 0.951 g/cc, or 0.955 g/cc, or 0.960 g/cc, or 0.965 g/cc.

In an embodiment, the EVA/MAH terpolymer has a melting point from 50° C., or 55° C., or 60° C., or 65° C. to 68° C., or 70° C., or 75° C., or 80° C.

In an embodiment, the EVA/MAH terpolymer has a melt index (190° C., 2.16 kg) from 130 g/10 min, or 140 g/10 min, or 150 g/10 min to 160 g/10 min, or 170 g/10 min, or 180 g/10 min, or 190 g/10 min, or 200 g/10 min, or 210 g/10 min, or 220 g/10 min, or 230 g/10 min.

In an embodiment, the EVA/MAH terpolymer has one, some, or all of the following properties: (a) a density from 0.940 g/cc, or 0.945 g/cc, or 0.950 g/cc to 0.951 g/cc, or 0.955 g/cc, or 0.960 g/cc, or 0.965 g/cc; and/or (b) a melting point from 50° C., or 55° C., or 60° C., or 65° C. to 68° C., or 70° C., or 75° C., or 80° C.; and/or (c) a melt index (190° C., 2.16 kg) from 130 g/10 min, or 140 g/10 min, or 150 g/10 min to 160 g/10 min, or 170 g/10 min, or 180 g/10 min, or 190 g/10 min, or 200 g/10 min, or 210 g/10 min, or 220 g/10 min, or 230 g/10 min.

In an embodiment, the EVA/MAH terpolymer contains (a) from 69 wt %, or 69.36 wt % to 73.36, or 74 wt % ethylene, (b) from 26 wt % to 30 wt % vinyl acetate, and (c) 0.64 wt % maleic anhydride, based on the total weight of the EVA/MAH terpolymer, and the EVA/MAH terpolymer has a density of 0.951 g/cc, a melting point of 68° C., and a melt index (190° C., 2.16 kg) from 150 g/10 min to 210 g/10 min.

In an embodiment, the EVA/MAH terpolymer is a random EVA/MAH terpolymer. A nonlimiting example of a suitable EVA/MAH random terpolymer is OREVAC™ T 9305, commercially available from Arkema.

The EVA/MAH terpolymer may comprise two or more embodiments disclosed herein.

(ii) Ethylene/Methyl Acrylate/Glycidyl Methacrylate Terpolymer

In an embodiment, the coating includes an ethylene/methyl acrylate/glycidyl methacrylate terpolymer. An "ethylene/methyl acrylate/glycidyl methacrylate terpolymer" or "EMA/GMA terpolymer" is an interpolymer that contains, in polymerized form, ethylene monomer, methyl acrylate comonomer, and glycidyl methacrylate comonomer.

In an embodiment, the EMA/GMA terpolymer contains from 50 wt %, or 55 wt %, or 60 wt % to 65 wt %, or 70 wt %, or 75 wt %, or 80 wt %, or 85 wt % ethylene, based on the total weight of the EMA/GMA terpolymer.

In an embodiment, the EMA/GMA terpolymer contains from 15 wt %, or 20 wt % to 25 wt %, or 26 wt %, or 30 wt %, or 35 wt %, or 40 wt % methyl acrylate, based on the total weight of the EMA/GMA terpolymer.

In an embodiment, the EMA/GMA terpolymer contains from 0.1 wt %, or 0.5 wt %, or 0.6 wt %, or 0.7 wt %, or 0.8 wt %, or 0.9 wt %, or 1.0 wt %, or 2 wt %, or 5 wt % to 8 wt %, or 10 wt % glycidyl methacrylate, based on the total weight of the EMA/GMA terpolymer.

In an embodiment, the EMA/GMA terpolymer contains (a) from 50 wt %, or 55 wt %, or 60 wt % to 65 wt %, or 70 wt %, or 75 wt %, or 80 wt %, or 85 wt % ethylene, (b) from 15 wt %, or 20 wt % to 25 wt %, or 26 wt %, or 30 wt %, or 35 wt %, or 40 wt % methyl acrylate, and (c) from 0.1 wt %, or 0.5 wt %, or 0.6 wt %, or 0.7 wt %, or 0.8 wt %, or 0.9 wt %, or 1.0 wt %, or 2 wt %, or 5 wt % to 8 wt %, or 10 wt % glycidyl methacrylate, based on the total weight of the EMA/GMA terpolymer. In a further embodiment, the EMA/GMA terpolymer contains (a) 68 wt % ethylene, (b) 24 wt % methyl acrylate, and (c) 8 wt % glycidyl methacrylate, based on the total weight of the EMA/GMA terpolymer.

In an embodiment, the EMA/GMA terpolymer has a density from 0.930 g/cc, or 0.935 g/cc, or 0.940 g/cc, or 0.945 g/cc, or 0.950 g/cc to 0.951 g/cc, or 0.955 g/cc, or 0.960 g/cc.

In an embodiment, the EMA/GMA terpolymer has a melting point from 50° C., or 55° C., or 60° C., or 65° C. to 68° C., or 70° C., or 75° C., or 80° C.

In an embodiment, the EMA/GMA terpolymer has a melt index (190° C., 2.16 kg) from 1 g/10 min, or 5 g/10 min to 6 g/10 min, or 10 g/10 min, or 15 g/10 min, or 20 g/10 min, or 30 g/10 min, or 40 g/10 min, or 50 g/10 min.

In an embodiment, the EMA/GMA terpolymer has one, some, or all of the following properties: (a) a density from 0.930 g/cc, or 0.935 g/cc, or 0.940 g/cc, or 0.945 g/cc, or 0.950 g/cc to 0.951 g/cc, or 0.955 g/cc, or 0.960 g/cc; and/or (b) a melting point from 50° C., or 55° C., or 60° C., or 65° C. to 68° C., or 70° C., or 75° C., or 80° C.; and/or (c) a melt index (190° C., 2.16 kg) from 1 g/10 min, or 5 g/10 min to 6 g/10 min, or 10 g/10 min, or 15 g/10 min, or 20 g/10 min, or 30 g/10 min, or 40 g/10 min, or 50 g/10 min.

In an embodiment, the EMA/GMA terpolymer contains (a) 68 wt % ethylene, (b) 24 wt % methyl acrylate, and (c) 8 wt % glycidyl methacrylate, based on the total weight of the EMA/GMA terpolymer, and the EMA/GMA terpolymer has a density of 0.940 g/cc, a melting point of 65° C., and a melt index (190° C., 2.16 kg) of 6 g/10 min.

In an embodiment, the EMA/GMA terpolymer is a random EMA/GMA terpolymer. A nonlimiting example of a suitable EMA/GMA random terpolymer is LOTADER™ AX8900, commercially available from Arkema.

The EMA/GMA terpolymer may comprise two or more embodiments disclosed herein.

In an embodiment, the coating includes (i) an EVA/MAH terpolymer and (ii) an EMA/GMA terpolymer.

Primer Composition

In an embodiment, (i) the ethylene/vinyl acetate/maleic anhydride terpolymer and/or (ii) the ethylene/methyl acrylate/glycidyl methacrylate terpolymer is applied to the (A) polyester fabric as part of a primer composition. The primer composition contains at least one of (i) the ethylene/vinyl acetate/maleic anhydride terpolymer and (ii) the ethylene/methyl acrylate/glycidyl methacrylate terpolymer; and (iii) a solvent and (iv) optional crosslinking agent. In a further embodiment, the primer composition contains (i) the EVA/MAH terpolymer or the EMA/GMA terpolymer; and (ii) a solvent and (iii) optional crosslinking agent.

Nonlimiting examples of suitable methods to apply the primer composition to the (A) polyester fabric include drawdown, rod coating, roller coating, brushing, dipping, pouring or spraying techniques. In an embodiment, the primer composition is poured onto the (A) polyester fabric and spread out by way of a coating bar or grooved (wound) rod. In another embodiment, the primer composition is roller coated onto the (A) polyester fabric.

(iii) Solvent

In an embodiment, a primer composition is provided. The primer composition includes a solvent. The solvent may be a hydrocarbon solvent, a polar solvent, and combinations thereof.

In an embodiment, the solvent is a hydrocarbon solvent. A "hydrocarbon solvent" contains only hydrogen and carbon atoms, including branched or unbranched, saturated or unsaturated, cyclic, polycyclic or acyclic species, and combinations thereof. In an embodiment, the hydrocarbon solvent is selected from aromatic hydrocarbon solvents, aliphatic hydrocarbon solvents, and combinations thereof. An "aromatic hydrocarbon" is a hydrocarbon that contains one or more benzene rings. Nonlimiting examples of aromatic hydrocarbon solvents include toluene and xylene. In an embodiment, the hydrocarbon solvent is an aromatic hydrocarbon solvent that is toluene. An "aliphatic hydrocarbon" is a hydrocarbon that is an alkane, an alkene, an alkyne, or a derivative of an alkane, an alkene or an alkyne. An aliphatic hydrocarbon excludes aromatic hydrocarbon. Nonlimiting examples of aliphatic hydrocarbon solvents include hexane, cyclohexane and methylcyclohexane (MCH). In an embodiment, the hydrocarbon solvent is an aliphatic hydrocarbon solvent containing methylcyclohexane (MCH).

The hydrocarbon solvent may comprise two or more embodiments disclosed herein.

In an embodiment, the solvent is a polar solvent. A "polar solvent" is a solvent containing a polar group. A "polar group" is any group that imparts a bond dipole moment to an otherwise essentially nonpolar molecule. Exemplary polar groups include alcohols, carbonyls, and carboxylic esters. Nonlimiting examples of polar solvents include alcohols, ketones, esters, and water. In an embodiment, the polar solvent is a ketone. Nonlimiting examples of suitable ketones include acetone, methyl ethyl ketone and cyclohexanone. In an embodiment, the polar solvent is an ester. Nonlimiting examples of suitable esters include butyl acetate and ethyl acetate. In an embodiment, the polar solvent is water.

In an embodiment, the primer composition includes a polar solvent and a hydrocarbon solvent. In a further embodiment, the primer composition includes a polar solvent that is an ester, such as ethyl acetate, and a hydrocarbon solvent that is an aromatic hydrocarbon solvent, such as toluene. In another embodiment, the primer composition includes a polar solvent that is an ester, such as ethyl acetate, and a hydrocarbon solvent that is an aliphatic hydrocarbon solvent, such as methylcyclohexane (MCH).

The solvent may comprise two or more embodiments disclosed herein.

(iv) Crosslinking Agent

In an embodiment, a primer composition is provided. The primer composition optionally includes a crosslinking agent.

A nonlimiting example of a suitable crosslinking agent is a polyisocyanate. A "polyisocyanate" is a molecule with at least two, or at least three isocyanate groups in its structure. An "isocyanate group" (or NCO) is represented by the formula: —N═C═O.

A nonlimiting example of a suitable polyisocyanate is tris(p-isocyanatophenyl) thiophosphate (commercially available as DESMODUR™ RFE from Bayer MaterialScience).

In an embodiment, the composition excludes a crosslinking agent.

The crosslinking agent may comprise two of more embodiments disclosed herein.

In an embodiment, the primer composition includes:

(i) from 0 wt %, or 5 wt %, or 10 wt % to 15 wt %, or 20 wt % of the EVA/MAH terpolymer;

(ii) from 0 wt %, or 5 wt %, or 10 wt % to 15 wt %, or 20 wt % of the EMA/GMA terpolymer;

(iii) from 70 wt %, or 75 wt %, or 80 wt % to 85 wt %, or 88 wt %, or 90 wt %, or 95 wt % solvent; and (iv) from 0 wt %, or 0.10 wt %, or 0.15 wt % to 0.20 wt %, or 0.25 wt %, or 0.50 wt %, or 1.0 wt %, or 2.0 wt %, or 5.0 wt %, or 10 wt %, or 15 wt % crosslinking agent, such as a polyisocyanate, with the proviso that the primer composition contains greater than 0 wt %, or from 5 wt %, or 10 wt % to 15 wt %, or 20 wt % of at least one of the (i) EVA/MAH terpolymer and the (ii) EMA/GMA terpolymer, based on the total weight of the primer composition; and the proviso that, when the EMA/GMA terpolymer is present, the primer composition includes (iv) greater than 0 wt %, or from 0.10 wt %, or 0.15 wt % to 0.20 wt %, or 0.25 wt %, or 0.50 wt %, or 1.0 wt %, or 2.0 wt %, or 5.0 wt %, or 10 wt %, or 15 wt % crosslinking agent; and the primer composition has one, some, or all of the following properties: (a) a Brookfield viscosity from 50 cP, or 60 cP, or 70 cP to 75 cP, or 80 cP, or 90 cP, or 100 cP, or 125 cP, or 150 cP, or 175 cP, or 200 cP, or 210 cP, or 220 cP, or 230 cP, or 240 cP, or 250 cP; and/or (b) a pot-life from 4 hours, or greater than 4 hours to 8 hours; and/or (c) a solids content from 5 wt %, or 7 wt %, or 10 wt %, or 12 wt % to 15 wt %, or 20 wt %, or 25 wt %, or 30 wt %, or 35 wt %, or 40 wt %, based on the total weight of the primer composition. The "solids content" of the primer composition refers to the weight of the (i) EVA/MAH terpolymer and/or (ii) EMA/GMA terpolymer dissolved in the solvent, based on the total weight of the primer composition.

In an embodiment, the primer composition has a pot-life from 4 hours, or greater than 4 hours to 8 hours. The "pot-life" of a primer composition is the time between combination of a crosslinking agent with a mixture containing a polymeric component and a solvent, and when the combination begins to gel. A longer pot-life is advantageous for processing because it allows for a longer window for coating after the crosslinking agent has been included in the primer composition, and before the primer composition gels and becomes unsuitable for coating. Primer compositions that do not include a crosslinking agent do not have a pot-life.

In an embodiment, the primer composition contains the EVA/MAH terpolymer, and the primer composition excludes a crosslinking agent.

In an embodiment, the primer composition contains the EMA/GMA terpolymer and a crosslinking agent, such as a polyisocyanate.

In an embodiment, the primer composition contains an additive. Nonlimiting examples of suitable primer composition additives include viscosity modifiers (such as rosin esters and cellulose), ethylene ethyl acrylate (EEA) copolymer, functionalized EEA copolymer (such as maleic anhydride-grafted EEA copolymer), ethylene butyl acrylate (EBA) copolymer, functionalized EVA copolymer (such as maleic anhydride-grafted EBA copolymer), and combinations thereof.

Advantageously, the primer composition has sufficient penetration into the (A) polyester fabric, and into the closed mesh polyester fabric in particular. Furthermore, the primer composition provides high adhesion (e.g., a peel strength greater than 12 N/cm for articles with an outer layer containing ethylene/α-olefin multi-block copolymer and filler) for difficult-to-bond substrates (i.e., the polyester fabric and the filled ethylene/α-olefin multi-block copolymer outer layer).

In an embodiment, the primer composition is dried after it is applied to the (A) polyester fabric to evaporate at least 90 wt %, or 98 wt %, or 99 wt %, or 100 wt % of the solvent(s), based on the weight of the solvent composition in the primer composition, to form an adhesive layer, or a coating. In an embodiment, 100 wt % of the solvent is evaporated, based on the weight of the total weight of solvent in the primer composition.

The primer composition is dried to form a coating. In an embodiment, the coating is an adhesive layer. Nonlimiting examples of methods to dry the primer composition after it has been applied to the (A) polyester fabric include drying the article in an oven at a temperature equal to or greater than 90° C., or equal to or greater than 100° C. for at least 0.5 minutes, at least 1 minute, at least 2 minutes, or at least 3 minutes.

In an embodiment, the coating, and further the adhesive layer, has a coat weight after drying of from 5 $g/m^2$, or 10 $g/m^2$ to 15 $g/m^2$, or 20 $g/m^2$, or 25 $g/m^2$, or 30 $g/m^2$, or 35 $g/m^2$, or 40 $g/m^2$.

In an embodiment, the coating, and further the adhesive layer, includes:

- (i) from 0 wt %, or 50 wt %, or 60 wt %, or 70 wt %, or 80 wt % to 90 wt %, or 95 wt %, or 98 wt %, or 99 wt %, or 100 wt % of the EVA/MAH terpolymer;
- (ii) from 0 wt %, or 50 wt %, or 60 wt %, or 70 wt %, or 80 wt % to 90 wt %, or 95 wt %, or 98 wt %, or 99 wt %, or 100 wt % of the EMA/GMA terpolymer;
- (iii) from 0 wt % to 1 wt %, or 2 wt %, or 5 wt %, or 10 wt % solvent; and
- (iv) from 0 wt %, or 0.10 wt %, or 0.15 wt % to 0.20 wt %, or 0.25 wt %, or 0.50 wt %, or 1.0 wt %, or 2.0 wt %, or 5.0 wt %, or 10 wt %, or 15 wt % crosslinking agent, with the proviso that the coating contains greater than 0 wt %, or from 50 wt %, or 60 wt %, or 70 wt %, or 80 wt % to 90 wt %, or 95 wt %, or 98 wt %, or 99 wt %, or 100 wt % of at least one of the (i) EVA/MAH terpolymer and the (ii) EMA/GMA terpolymer, based on the total weight of the coating; and the proviso that, when the EMA/GMA terpolymer is present, the coating includes (iv) greater than 0 wt %, or from 0.10 wt %, or 0.15 wt % to 0.20 wt %, or 0.25 wt %, or 0.50 wt %, or 1.0 wt %, or 2.0 wt %, or 5.0 wt %, or 10 wt %, or 15 wt % crosslinking agent.

In an embodiment, the article includes (A) a polyester fabric; and (B) a coating on a surface of the polyester fabric, the coating containing the EVA/MAH terpolymer, and the coating excluding a crosslinking agent, and the coating excluding the EMA/GMA terpolymer, and the article is halogen-free. In a further embodiment, the coating includes from 50 wt %, or 60 wt %, or 70 wt % to 80 wt %, or 90 wt %, or 95 wt %, or 99 wt %, or 100 wt % EVA/MAH, based on the total weight of the coating (dried).

In an embodiment, the article includes (A) a polyester fabric; and (B) a coating on a surface of the polyester fabric, the coating containing the EMA/GMA terpolymer crosslinked with a crosslinking agent such as a polyisocyanate, and the coating excludes the EVA/MAH terpolymer. The polyester fabric can be any polyester fabric disclosed herein, such as a closed mesh PET fabric. In a further embodiment, the coating includes from 50 wt %, or 60 wt %, or 70 wt % to 80 wt %, or 85 wt %, or 90 wt %, or 95 wt %, or 99 wt %, or less than 100 wt % EMA/GMA and from greater than 0 wt %, or from 0.10 wt %, or 0.15 wt % to 0.20 wt %, or 0.25 wt %, or 0.50 wt %, or 1.0 wt %, or 2.0 wt %, or 5.0 wt %, or 10 wt %, or 15 wt % crosslinking agent based on the total weight of the coating (dried).

The coating may comprise two or more embodiments disclosed herein.

C. Outer Layer

In an embodiment, the present article includes an optional outer layer. When the outer layer is present it is adhered to the coating, or further is adhered to the adhesive layer. The outer layer includes (i) an olefin block copolymer that is an ethylene/α-olefin multi-block copolymer and (ii) a filler, and (iii) optional additive.

(i) Olefin Block Copolymer

The outer layer includes an olefin block copolymer. The term "olefin block copolymer" or "OBC" refers to an ethylene/α-olefin multi-block copolymer and includes ethylene and one or more copolymerizable α-olefin comonomer in polymerized form, characterized by multiple blocks or segments of two or more polymerized monomer units differing in chemical or physical properties. The term "ethylene/α-olefin multi-block copolymer" includes block copolymer with two blocks (di-block) and more than two blocks (multi-block). The terms "interpolymer" and "copolymer" are used interchangeably herein. When referring to amounts of "ethylene" or "comonomer" in the copolymer, it is understood that this refers to polymerized units thereof. In some embodiments, the ethylene/α-olefin multi-block copolymer can be represented by the following formula:

$$(AB)_n$$

where n is at least 1, preferably an integer greater than 1, such as 2, 3, 4, 5, 10, 15, 20, 30, 40, 50, 60, 70, 80, 90, 100, or higher, "A" represents a hard block or segment, and "B" represents a soft block or segment. Preferably, As and Bs are linked, or covalently bonded, in a substantially linear fashion, or in a linear manner, as opposed to a substantially branched or substantially star-shaped fashion. In other embodiments, A blocks and B blocks are randomly distributed along the polymer chain. In other words, the block copolymers usually do not have a structure as follows:

*AAA-AA-BBB-BB*

In still other embodiments, the block copolymers do not usually have a third type of block, which comprises different comonomer(s). In yet other embodiments, each of block A and block B has monomers or comonomers substantially randomly distributed within the block. In other words, neither block A nor block B comprises two or more sub-segments (or sub-blocks) of distinct composition, such as a tip segment, which has a substantially different composition than the rest of the block.

Preferably, ethylene comprises the majority mole fraction of the whole block copolymer, i.e., ethylene comprises at least 50 mole percent of the whole polymer. More preferably ethylene comprises at least 60 mole percent, at least 70 mole percent, or at least 80 mole percent, with the substantial remainder of the whole polymer comprising at least one other comonomer that is preferably an α-olefin having 3 or more carbon atoms. In some embodiments, the ethylene/α-olefin multi-block copolymer may comprise 50 mol % to 90 mol % ethylene, or 60 mol % to 85 mol % ethylene, or 65 mol % to 80 mol % ethylene. For many ethylene/octene multi-block copolymers, the composition comprises an ethylene content greater than 80 mole percent of the whole polymer and an octene content of from 10 to 15 mole percent, or from 15 to 20 mole percent of the whole polymer.

The ethylene/α-olefin multi-block copolymer includes various amounts of "hard" segments and "soft" segments. "Hard" segments are blocks of polymerized units in which ethylene is present in an amount greater than 90 weight percent, or 95 weight percent, or greater than 95 weight percent, or greater than 98 weight percent based on the weight of the polymer, up to 100 weight percent. In other words, the comonomer content (content of monomers other than ethylene) in the hard segments is less than 10 weight percent, or 5 weight percent, or less than 5 weight percent, or less than 2 weight percent based on the weight of the polymer, and can be as low as zero. In some embodiments, the hard segments include all, or substantially all, units derived from ethylene. "Soft" segments are blocks of polymerized units in which the comonomer content (content of monomers other than ethylene) is greater than 5 weight percent, or greater than 8 weight percent, greater than 10 weight percent, or greater than 15 weight percent based on the weight of the polymer. In some embodiments, the comonomer content in the soft segments can be greater than 20 weight percent, greater than 25 weight percent, greater than 30 weight percent, greater than 35 weight percent, greater than 40 weight percent, greater than 45 weight percent, greater than 50 weight percent, or greater than 60 weight percent and can be up to 100 weight percent.

The soft segments can be present in an ethylene/α-olefin multi-block copolymer from 1 wt % to 99 wt % of the total weight of the ethylene/α-olefin multi-block copolymer, or from 5 wt % to 95 wt %, from 10 wt % to 90 wt %, from 15 wt % to 85 wt %, from 20 wt % to 80 wt %, from 25 wt % to 75 wt %, from 30 wt % to 70 wt %, from 35 wt % to 65 wt %, from 40 wt % to 60 wt %, or from 45 wt % to 55 wt % of the total weight of the ethylene/α-olefin multi-block copolymer. Conversely, the hard segments can be present in similar ranges. The soft segment weight percentage and the hard segment weight percentage can be calculated based on data obtained from DSC or NMR. Such methods and calculations are disclosed in, for example, U.S. Pat. No. 7,608,668, entitled "Ethylene/α-Olefin Block Inter-Polymers," filed on Mar. 15, 2006, in the name of Colin L. P. Shan, Lonnie Hazlitt, et. al. and assigned to Dow Global Technologies Inc., the disclosure of which is incorporated by reference herein in its entirety. In particular, hard and soft segment weight percentages and comonomer content may be determined as described in column 57 to column 63 of U.S. Pat. No. 7,608,668.

The ethylene/α-olefin multi-block copolymer is a polymer comprising two or more chemically distinct regions or segments (referred to as "blocks") preferably joined (or covalently bonded) in a linear manner, that is, a polymer comprising chemically differentiated units which are joined end-to-end with respect to polymerized ethylenic functionality, rather than in pendent or grafted fashion. In an embodiment, the blocks differ in the amount or type of incorporated comonomer, density, amount of crystallinity, crystallite size attributable to a polymer of such composition, type or degree of tacticity (isotactic or syndiotactic), regio-regularity or regio-irregularity, amount of branching (including long chain branching or hyper-branching), homogeneity or any other chemical or physical property. Compared to block interpolymers of the prior art, including interpolymers produced by sequential monomer addition, fluxional catalysts, or anionic polymerization techniques, the present ethylene/α-olefin multi-block copolymer is characterized by unique distributions of both polymer polydispersity (PDI or Mw/Mn or MWD), polydisperse block length distribution, and/or polydisperse block number distribution, due, in an embodiment, to the effect of the shuttling agent(s) in combination with multiple catalysts used in their preparation.

In an embodiment, the ethylene/α-olefin multi-block copolymer is produced in a continuous process and possesses a polydispersity index (Mw/Mn) from 1.7 to 3.5, or from 1.8 to 3, or from 1.8 to 2.5, or from 1.8 to 2.2. When produced in a batch or semi-batch process, the ethylene/α-olefin multi-block copolymer possesses Mw/Mn from 1.0 to 3.5, or from 1.3 to 3, or from 1.4 to 2.5, or from 1.4 to 2.

In addition, the ethylene/α-olefin multi-block copolymer possesses a PDI (or Mw/Mn) fitting a Schultz-Flory distribution rather than a Poisson distribution. The present ethylene/α-olefin multi-block copolymer has both a polydisperse block distribution as well as a polydisperse distribution of block sizes. This results in the formation of polymer products having improved and distinguishable physical properties. The theoretical benefits of a polydisperse block distribution have been previously modeled and discussed in Potemkin, *Physical Review E* (1998) 57 (6), pp. 6902-6912, and Dobrynin, *J. Chem. Phvs.* (1997) 107 (21), pp 9234-9238.

In an embodiment, the present ethylene/α-olefin multi-block copolymer possesses a most probable distribution of block lengths.

In a further embodiment, the ethylene/α-olefin multi-block copolymer of the present disclosure, especially those made in a continuous, solution polymerization reactor, possess a most probable distribution of block lengths. In one embodiment of this disclosure, the ethylene multi-block interpolymers are defined as having:

(A) Mw/Mn from about 1.7 to about 3.5, at least one melting point, Tm, in degrees Celsius,, and a density, d, in grams/cubic centimeter, where in the numerical values of Tm and d correspond to the relationship:

$$Tm > -2002.9 + 4538.5(d) - 2422.2(d)^2, \text{ and/or}$$

(B) Mw/Mn from about 1.7 to about 3.5, and is characterized by a heat of fusion, ΔH in J/g, and a delta quantity, ΔT, in degrees Celsius defined as the temperature difference between the tallest DSC peak and the tallest Crystallization Analysis Fractionation ("CRYSTAF") peak, wherein the numerical values of ΔT and ΔH have the following relationships:

$$\Delta T > -0.1299\ \Delta H + 62.81 \text{ for } \Delta H \text{ greater than zero and up to 130 J/g}$$

$$\Delta T \geq 48°\text{ C. for } \Delta H \text{ greater than 130 J/g}$$

wherein the CRYSTAF peak is determined using at least 5 percent of the cumulative polymer, and if less than 5 percent of the polymer has an identifiable CRYSTAF peak, then the CRYSTAF temperature is 30° C.; and/or (C) elastic recovery, Re, in percent at 300 percent strain and 1 cycle measured with a compression-molded film of the ethylene/α-olefin interpolymer, and has a density, d, in grams/cubic centimeter, wherein the numerical values of Re and d satisfy the following relationship when ethylene/α-olefin interpolymer is substantially free of crosslinked phase:

$$Re > 1481 - 1629(d); \text{ and/or}$$

(D) has a molecular fraction which elutes between 40° C. and 130° C. when fractionated using TREF, characterized in that the fraction has a molar comonomer content of at least 5 percent higher than that of a comparable random ethylene interpolymer fraction eluting between the same temperatures, wherein said comparable random ethylene interpolymer has the same comonomer(s) and has a melt index, density and molar comonomer content (based on the whole polymer) within 10 percent of that of the ethylene/α-olefin interpolymer; and/or (E) has a storage modulus at 25° C., G'(25° C.), and a storage modulus at 100° C., G'(100° C.), wherein the ratio of G'(25° C.) to G'(100° C.) is in the range of 1:1 to 9:1.

The ethylene/α-olefin multi-block copolymer may also have:

(F) a molecular fraction which elutes between 40° C. and 130° C. when fractionated using TREF, characterized in that the fraction has a block index of at least 0.5 and up to 1 and a molecular weight distribution, Mw/Mn, greater than 1.3; and/or (G) average block index greater than zero and up to 1.0 and a molecular weight distribution, Mw/Mn greater than 1.3.

It is understood that the ethylene/α-olefin multi-block copolymer may have one, some, all, or any combination of properties (A)-(G). Block Index can be determined as described in detail in U.S. Pat. No. 7,608,668 herein incorporated by reference for that purpose. Analytical methods for determining properties (A) through (G) are disclosed in, for example, U.S. Pat. No. 7,608,668, col. 31 line 26 through col. 35 line 44, which is herein incorporated by reference for that purpose.

Suitable monomers for use in preparing the present ethylene/α-olefin multi-block copolymer include ethylene and one or more addition polymerizable monomers other than ethylene. Examples of suitable comonomers include straight-chain or branched α-olefins of 3 to 30, or 3 to 20, or 4 to 8 carbon atoms, such as propylene, 1-butene, 1-pentene, 3-methyl-l-butene, 1-hexene, 4-methyl-1-pentene, 3-methyl-1-pentene, 1-octene, 1-decene, 1-dodecene, 1-tetradecene, 1-hexadecene, 1-octadecene and 1-eicosene; cyclo-olefins of 3 to 30, or 3 to 20, carbon atoms, such as cyclopentene, cycloheptene, norbornene, 5-methyl-2-norbornene, tetracyclododecene, and 2-methyl-1,4,5,8-dimethano-1,2,3,4,4a,5,8,8a-octahydronaphthalene; di- and polyolefins, such as butadiene, isoprene, 4-methyl-1,3-pentadiene, 1,3-pentadiene, 1,4-pentadiene, 1,5-hexadiene, 1,4-hexadiene, 1,3-hexadiene, 1,3-octadiene, 1,4-octadiene, 1,5-octadiene, 1,6-octadiene, 1,7-octadiene, ethylidenenorbornene, vinyl norbornene, dicyclopentadiene, 7-methyl-1,6-octadiene, 4-ethylidene-8-methyl-1,7-nonadiene, and 5,9-dimethyl-1,4,8-decatriene; and 3-phenylpropene, 4-phenylpropene, 1,2-difluoroethylene, tetrafluoroethylene, and 3,3,3-trifluoro-1-propene.

In an embodiment, the ethylene/α-olefin multi-block copolymer is void of, or otherwise excludes, styrene (i.e., is styrene-free), and/or vinyl aromatic monomer, and/or conjugated diene.

In an embodiment, the ethylene/α-olefin multi-block copolymer consists of ethylene and a comonomer that is a $C_4$-$C_8$ α-olefin. The $C_4$-$C_8$ α-olefin is selected from butene, hexene, and octene.

In an embodiment, the ethylene/α-olefin multi-block copolymer has hard segments and soft segments, is styrene-free, consists of only (i) ethylene and (ii) a $C_4$-$C_8$ α-olefin, and is defined as having a Mw/Mn from 1.7 to 3.5, at least one melting point, Tm, in degrees Celsius, and a density, d, in grams/cubic centimeter, wherein the numerical values of Tm and d correspond to the relationship:

$$Tm > -2002.9 + 4538.5(d) - 2422.2(d)^2,$$

where the density, d, is from 0.850 g/cc, or 0.860 g/cc, or 0.870 g/cc, or 0.875 g/cc to 0.880 g/cc, or 0.890 g/cc; and the melting point, Tm, is from 110° C., or 115° C., or 120° C. to 125° C., or 130° C., or 135° C.

In an embodiment, the ethylene/α-olefin multi-block copolymer is an ethylene/octene multi-block copolymer (consisting only of ethylene and octene comonomer) and has one, some, any combination of, or all of the following properties (1)-(12): (1) a Mw/Mn from 1.7, or 1.8 to 2.2, or 2.5, or 3.5; and/or (2) a density from 0.850 g/cc, or 0.860 g/cc, or 0.870 g/cc, or 0.875 g/cc to 0.880 g/cc, or 0.890 g/cc; and/or (3) a melting point, Tm, from 110° C., or 115° C., or 120° C. to 125° C., or 130° C., or 135° C.; and/or (4) a Shore A value of 40, or 50, or 55, or 60, or 76, or 70 to 75, or 77, or 80, or 85; and/or (5) a melt index (MI) from 0.1 g/10 min, or 0.5 g/10 min to 1.0 g/10 min, or 2.0 g/10 min, or 5 g/10 min, or 10 g/10 min, or 15 g/10 min, or 20 g/10 min, or 30 g/10 min; and/or (6) a tensile strength at break from 7 PMa, or 10 MPa, or 13 MPa to 14 MPa, or 15 MPa, or 20 MPa, or 25 MPa, or 30 MPa; and/or (7) an elongation at break from 500%, or 600%, or 700%, or 750% to 800%, or 900%, or 1000%; and/or (8) 50-85 wt % soft segment and 40-15 wt % hard segment; and/or (9) from 10 mol %, or 13 mol %, or 14 mol %, or 15 mol % to 16 mol %, or 17 mol %, or 18 mol %, or 19 mol %, or 20 mol % C4-C12 α-olefin in the soft segment; and/or (10) from 0.5 mol %, or 1.0 mol %, or 2.0 mol %, or 3.0 mol % to 4.0 mol %, or 5 mol %, or 6 mol %, or 7 mol %, or 9 mol % octene in the hard segment; and/or (11) an elastic recovery (Re) from 50%, or 60% to 70%, or 80%, or 90%, at 300% 300% $min^{-1}$ deformation rate at 21° C. as measured in accordance with ASTM D 1708; and/or (12) a polydisperse distribution of blocks and a polydisperse distribution of block sizes.

In an embodiment, the ethylene/α-olefin multi-block copolymer is an ethylene/octene multi-block copolymer. In a further embodiment, the ethylene/α-olefin multi-block copolymer is an ethylene/octene block copolymer having one, some, or all of the following properties: a melt index (190° C./2.16 kg) of 0.50 g/10 min, a melting point of 122° C., a density of 0.879 g/cc, a Shore A value of 77, a tensile strength at break equal to or greater than 13.2 MPa, and/or an elongation at break equal to or greater than 750%.

In an embodiment, the ethylene/octene multi-block copolymer is sold under the tradename INFUSE™, available from The Dow Chemical Company, Midland, Michigan, USA. In a further embodiment, the ethylene/octene multi-block copolymer is INFUSE™ 9010.

The ethylene/α-olefin multi-block copolymers can be produced via a chain shuttling process such as described in U.S. Pat. No. 7,858,706, which is herein incorporated by reference. In particular, suitable chain shuttling agents and related information are listed in col. 16 line 39 through col. 19 line 44. Suitable catalysts are described in col. 19 line 45 through col. 46 line 19 and suitable co-catalysts in col. 46 line 20 through col. 51 line 28. The process is described throughout the document, but particularly in col. 51 line 29 through col. 54 line 56. The process is also described, for example, in the following: U.S. Pat. Nos. 7,608,668; 7,893,166; and 7,947,793.

The outer layer may comprise more than one ethylene/α-olefin multi-block copolymer.

In an embodiment, the outer layer contains from 20 wt %, or 25 wt %, or 30 wt % to 35 wt %, or 40 wt %, or 45 wt %, or 50 wt % ethylene/α-olefin multi-block copolymer, based on the total weight of the outer layer.

The ethylene/α-olefin multi-block copolymer may comprise two or more embodiments disclosed herein.

(ii) Filler

The outer layer includes a filler. Nonlimiting examples of suitable fillers include carbon black; calcium carbonate ($CaCO_3$); clay; nanoclay; talc; silica; coal fly ash; any natural or synthetic, inorganic or organic compounds such as zeolite, magnesium hydroxide (MDH), aluminum trihydroxide (ATH), titanium dioxide ($TiO_2$), and aluminum hydroxide; layered double hydroxides, ammonium polyphosphates; phosphinates; monomeric phosphonates; oligomeric phosphonates; polyphosphonates; and combinations thereof. In an embodiment, the filler is magnesium hydroxide (MDH), such as Magnifin™ H-5 MV, available from Albemarle.

The outer layer may include more than one filler. In an embodiment, the outer layer includes magnesium hydroxide (MDH) and titanium dioxide ($TiO_2$).

In an embodiment, the outer layer contains from 40 wt %, or 45 wt %, or 50 wt %, or 55 wt %, or 60 wt % to 65 wt %, or 70 wt %, or 75 wt %, or 80 wt % filler, based on the total weight of the outer layer.

In an embodiment, the outer layer contains from 20 wt %, or 25 wt %, or 30 wt % to 35 wt %, or 40 wt %, or 45 wt %, or 50 wt % ethylene/α-olefin multi-block copolymer; and a reciprocal amount of filler or from 50 wt %, or 55 wt %, or 60 wt %, or 65 wt % to 70 wt %, or 75 wt %, or 80 wt % filler.

The filler may comprise two or more embodiments disclosed herein.

(iii) Additive

The present outer layer may include one or more additives. Nonlimiting examples of suitable additives include antioxidants, colorants, ultra violet (UV) absorbers or stabilizers, anti-blocking agents, flame retardants, coupling agents, compatibilizers, plasticizers, processing aids, and combinations thereof.

In an embodiment, the outer layer includes an antioxidant. Nonlimiting examples of suitable antioxidants include phenolic antioxidants, thio-based antioxidants, phosphate-based antioxidants, and hydrazine-based metal deactivators. Suitable phenolic antioxidants include high molecular weight hindered phenols, methyl-substituted phenol, phenols having substituents with primary or secondary carbonyls, and multifunctional phenols such as sulfur and phosphorous-containing phenol. In an embodiment, the antioxidant is pentaerythritol tetrakis(3-(3,5-di-tert-butyl-4-hydroxyphenyl)propionate), commercially available as Irganox® 1010 from BASF. In an embodiment, the antioxidant is tris(2,4-ditert-butylphenyl)phosphite, commercially available as IRGAFOS™ 168 from Ciba, Inc. In a further embodiment, the outer layer includes a blend of Irganox® 1010 and IRGAFOS™ 168 (commercially available as Irganox™ B 225 from BASF). In an embodiment, the outer layer contains from 0 wt %, or 0.001 wt %, or 0.01 wt %, or 0.02 wt %, or 0.05 wt %, or 0.1 wt %, or 0.2 wt %, or 0.3 wt %, or 0.4 wt % to 0.5 wt %, or 0.6 wt %, or 0.7 wt %, or 0.8 wt %, or 1.0 wt %, or 2.0 wt %, or 2.5 wt %, or 3.0 wt % antioxidant, based on total weight of the outer layer.

In an embodiment, the outer layer includes an ultra violet (UV) absorber or stabilizer. A nonlimiting example of a suitable UV stabilizer is a hindered amine light stabilizer (HALS). A nonlimiting examples of a suitable HALS is Chimassorb™ 2020 (commercially available from BASF). In an embodiment, the outer layer contains from 0 wt %, or 0.001 wt %, or 0.002 wt %, or 0.005 wt %, or 0.006 wt % to 0.007 wt %, or 0.008 wt %, or 0.009 wt %, or 0.01 wt %, or 0.2 wt %, or 0.3 wt %, or 0.4 wt %, or 0.5 wt %, 1.0 wt %, or 2.0 wt %, or 2.5 wt %, or 3.0 wt % UV absorber or stabilizer, based on total weight of the outer layer.

In an embodiment, the outer layer contains from 20 wt %, or 25 wt %, or 30 wt % to 35 wt %, or 40 wt %, or 45 wt %, or 50 wt % ethylene/α-olefin multi-block copolymer; from 40 wt %, or 45 wt %, or 50 wt %, or 55 wt %, or 60 wt % to 65 wt %, or 70 wt %, or 75 wt %, or 80 wt % filler; and from 0 wt %, or greater than 0 wt %, or 0.001 wt %, or 0.002 wt %, or 0.005 wt %, or 0.006 wt % to 0.007 wt %, or 0.008 wt %, or 0.009 wt %, or 0.01 wt %, or 0.2 wt %, or 0.3 wt %, or 0.4 wt %, or 0.5 wt %, 1.0 wt %, or 2.0 wt %, or 2.5 wt %, or 3.0 wt %, or 4.0 wt %, or 5.0 wt % to 6.0 wt %, or 7.0 wt %, or 8.0 wt %, or 9.0 wt %, or 10.0 wt % additive, based on the total weight of the outer layer.

Not wishing to be bound by any particular theory, Applicant believes the high filler load (from 40 wt %, or 60 wt % to 65 wt %, or 75 wt %, or 80 wt % filler) provides flame retardant properties to the outer layer containing ethylene/α-olefin multi-block copolymer.

The outer layer may comprise two or more embodiments disclosed herein.

It is understood that the sum of the components in each of the compositions and layers disclosed herein, including the foregoing compositions, yields 100 weight percent (wt %).

D. Article

The present disclosure provides an article. The article includes (A) a polyester fabric and (B) a coating on the surface of the polyester fabric. The coating includes at least one of (i) an EVA/MAH terpolymer and (ii) an EMA/GMA terpolymer. Optionally, the article includes (C) an outer layer and the article has a structure A/B/C. The optional (C)

outer layer includes an olefin block copolymer that is an ethylene/α-olefin multi-block copolymer and a filler.

The present disclosure provides another article. The article includes (A) a polyester fabric and (B) a coating that is an adhesive layer, the adhesive layer adhered to the polyester fabric and including at least one of (i) an EVA/MAH terpolymer and (ii) an EMA/GMA terpolymer; and (C) an outer layer, the outer layer adhered to the adhesive layer and including an ethylene/α-olefin multi-block copolymer and a filler.

In an embodiment, the adhesive layer contains either (i) the EVA/MAH terpolymer or (ii) the EMA/GMA terpolymer.

The polyester fabric, coating, adhesive layer, and outer layer may be any respective polyester fabric, coating, and outer layer disclosed herein. In an embodiment, the polyester fabric is a closed mesh polyester fabric. In a further embodiment, the polyester fabric is a closed mesh PET fabric.

Nonlimiting examples of suitable articles include coated fabrics; textile architectures such as banners and tents; reinforced tubing; multi-layer packaging films; and wire and cable applications.

In an embodiment, the article includes (A) a polyester fabric and (B) a coating that is an adhesive layer, the adhesive layer adhered to the polyester fabric and including at least one of (i) an EVA/MAH terpolymer and (ii) an EMA/GMA terpolymer; and (C) an outer layer, the outer layer adhered to the adhesive layer and including an ethylene/α-olefin multi-block copolymer and a filler; and the article has a structure A/B/C. In an embodiment, the article has a peel strength from 12 N/cm, or greater than 12 N/cm, or 16 N/cm to 20 N/cm, or 25 N/cm, or 30 N/cm, or 35 N/cm, or 40 N/cm, or 45 N/cm, or 50 N/cm.

In an embodiment, the article is halogen-free. A halogen-free article excludes polyvinyl chloride (PVC).

In an embodiment, the outer layer is extruded onto the coating or adhesive layer adhered to the polyester fabric. In an embodiment, the outer layer is extruded onto the coating or adhesive layer adhered to the polyester fabric at an extrusion temperature from 250° C., or 260° C., or 270° C. to 280° C., or 290° C., or 300° C. In an embodiment, after the outer layer is extruded onto the coating or adhesive layer adhered to the polyester fabric, the article is passed through a series of calendar rolls.

In an embodiment, the article with the A/B/C layer structure has a thickness from 0.5 mm, or 1.0 mm to 1.5 mm, or 2.0 mm, or 2.5 mm, or 3.0 mm, or 4.0 mm, or 5.0 mm, or 10 mm, or 20 mm.

Without wishing to be bound by any particular theory, Applicant believes a coating containing at least one of (i) an EVA/MAH terpolymer and (ii) an EMA/GMA terpolymer is compatible with both the ethylene/α-olefin multi-block copolymer and filler layer and the polyester fabric, resulting in improved adhesion between the (A) polyester fabric and (C) outer layer containing the ethylene/α-olefin multi-block copolymer and filler. In an embodiment, the article has a peel strength from 12 N/cm, or greater than 12 N/cm, or 16 N/cm to 20 N/cm, or 25 N/cm, or 30 N/cm, or 35 N/cm, or 40 N/cm, or 45 N/cm, or 50 N/cm. Further, the coating containing at least one of (i) an EVA/MAH terpolymer and (ii) an EMA/GMA terpolymer may advantageously be present at a low coat weight (from 5 g/m$^2$, or 10 g/m$^2$ to 15 g/m$^2$, or 20 g/m$^2$, or 40 g/m$^2$), which results in lower production costs.

In an embodiment, the article includes:

(A) a polyester fabric, such as a closed mesh polyester fabric or further a closed mesh PET fabric;

(B) a coating that is an adhesive layer, the adhesive layer adhered to the polyester fabric and including an EVA/MAH terpolymer; and (C) an outer layer, the outer layer adhered to the adhesive layer and including from 20 wt %, or 25 wt %, or 30 wt % to 35 wt %, or 40 wt %, or 45 wt %, or 50 wt % ethylene/α-olefin multi-block copolymer and from 40 wt %, or 45 wt %, or 50 wt %, or 55 wt %, or 60 wt % to 65 wt %, or 70 wt %, or 75 wt %, or 80 wt % filler, and optional additive; and the coating and/or the article are halogen-free; and the article has a structure A/B/C; and the article has one, some, any combination of, or all of the following properties (1)-(3): (1) a peel strength from 12 N/cm, or greater than 12 N/cm, or 16 N/cm to 20 N/cm, or 25 N/cm, or 30 N/cm, or 35 N/cm, or 40 N/cm, or 45 N/cm, or 50 N/cm; and/or (2) the coating has a coat weight from 5 g/m$^2$, or 10 g/m$^2$ to 15 g/m$^2$, or 20 g/m$^2$, or 25 g/m$^2$, or 30 g/m$^2$, or 35 g/m$^2$, or 40 g/m$^2$; and/or (3) the article has a thickness from 0.5 mm, or 1.0 mm to 1.5 mm, or 2.0 mm, or 2.5 mm, or 3.0 mm, or 4.0 mm, or 5.0 mm, or 10 mm, or 20 mm.

In an embodiment, the article includes:

(A) a polyester fabric, such as a closed mesh polyester fabric or further a closed mesh PET fabric;

(B) a coating that is an adhesive layer, the adhesive layer adhered to the polyester fabric and including an EMA/GMA terpolymer crosslinked with a crosslinking agent such as a polyisocyanate; and (C) an outer layer, the outer layer adhered to the adhesive layer and including from 20 wt %, or 25 wt %, or 30 wt % to 35 wt %, or 40 wt %, or 45 wt %, or 50 wt % ethylene/α-olefin multi-block copolymer and from 40 wt %, or 45 wt %, or 50 wt %, or 55 wt %, or 60 wt % to 65 wt %, or 70 wt %, or 75 wt %, or 80 wt % filler, and optional additive; and the coating and/or the article are halogen-free; and the article has a structure A/B/C; and the article has one, some, any combination of, or all of the following properties (1)-(3): (1) a peel strength from 12 N/cm, or greater than 12 N/cm, or 16 N/cm to 20 N/cm, or 25 N/cm, or 30 N/cm, or 35 N/cm, or 40 N/cm, or 45 N/cm, or 50 N/cm; and/or (2) the coating has a coat weight from 5 g/m$^2$, or 10 g/m$^2$ to 15 g/m$^2$, or 20 g/m$^2$, or 25 g/m$^2$, or 30 g/m$^2$, or 35 g/m$^2$, or 40 g/m$^2$; and/or (3) the article has a thickness from 0.5 mm, or 1.0 mm to 1.5 mm, or 2.0 mm, or 2.5 mm, or 3.0 mm, or 4.0 mm, or 5.0 mm, or 10 mm, or 20 mm.

The article may comprise two or more embodiments disclosed herein.

Test Methods

Density is measured in accordance with ASTM D792, Method B. The result is recorded in grams (g) per cubic centimeter (g/cc or g/cm$^3$).

Melt index (MI) ($I_2$) is measured according to ASTM D1238, Condition 190° C./2.16 kilogram (kg) weight, and is reported in grams eluted per 10 minutes (g/10 min).

Melt Flow (MF) for the styrenic block copolymer is measured in accordance with ASTM D1238, Condition 230° C./5.0 kilogram (kg) weight and is reported in g/10 min.

Brookfield viscosity is measured using a Brookfield DV-I Prime Viscometer. The spindle selection depends on the viscosity of the sample. For samples that are more viscous, or gelled, spindle TF96 is used. For samples that are less viscous, either spindle LV62 or LV63 is used. The viscosity measurement is recorded after 15 seconds at 23° C. The spindle is cleaned between measurements. Brookfield viscosity is measured at 100 rpm and is reported in centipoise (cP).

Unit Weight (i.e., the weight of the fabric per square meter) is measured by cutting a "0.254 m×0.127 m" sample of fabric and weighing the fabric using an analytical balance in grams. Then, the unit weight is calculated by dividing the measured weight by the area and the result is reported in grams per square meter (g/$m^2$).

Coat weight is measured by weighing the dried coated fabric using an analytical balance in grams, and determining the difference between the weight of the polyester fabric and the weight of the dried coated fabric. Then, the coat weight is calculated by dividing the measured weight difference by the areas and the result is reported in grams per square meter (g/$m^2$).

Tensile strength at break is measured according to ASTM D638, and is reported in megaPascals (MPa).

Elongation at break is measured in accordance with ASTM D638, and is reported in percent (%).

Shore A Hardness is measured in accordance with ASTM D2240.

Primer pot-life is determined by measuring the time between combination of a crosslinking agent (such as DESMODUR™ RFE) with a mixture containing a polymeric component and a solvent, and when the combination begins to gel. Onset of gel is visually determined. Primer pot-life is measured in hours.

Solution viscosity is measured in a 20% toluene solution at 25° C., in accordance with BAM 922, and is reported in millipascal-seconds (mPa·s).

Differential Scanning Calorimetry

Differential Scanning Calorimetry (DSC) can be used to measure the melting and crystallization behavior of a polymer over a wide range of temperature. For example, the TA Instruments Q1000 DSC, equipped with an RCS (refrigerated cooling system) and an autosampler is used to perform this analysis. During testing, a nitrogen purge gas flow of 50 ml/min is used. Each sample is melt pressed into a thin film at about 175° C.; the melted sample is then air-cooled to room temperature (about 25° C.). A 3-10 mg, 6 mm diameter specimen is extracted from the cooled polymer, weighed, placed in a light aluminum pan (ca 50 mg), and crimped shut. Analysis is then performed to determine its thermal properties.

The thermal behavior of the sample is determined by ramping the sample temperature up and down to create a heat flow versus temperature profile. First, the sample is rapidly heated to 180° C. and held isothermal for 3 minutes in order to remove its thermal history. Next, the sample is cooled to −40° C. at a 10° C./minute cooling rate and held isothermal at −40° C. for 3 minutes. The sample is then heated to 180° C. (this is the "second heat" ramp) at a 10° C./minute heating rate. The cooling and second heating curves are recorded. The cool curve is analyzed by setting baseline endpoints from the beginning of crystallization to −20° C. The heat curve is analyzed by setting baseline endpoints from −20° C. to the end of melt. The values determined are extrapolated onset of melting, Tm, and extrapolated onset of crystallization, Tc. Heat of fusion ($H_f$) (in Joules per gram), and the calculated % crystallinity for polyethylene samples using the following Equation: % Crystallinity=(($H_f$)/292 J/g)×100.

The heat of fusion ($H_f$) and the peak melting temperature are reported from the second heat curve. Peak crystallization temperature is determined from the cooling curve.

Melting point, Tm, is determined from the DSC heating curve by first drawing the baseline between the start and end of the melting transition. A tangent line is then drawn to the data on the low temperature side of the melting peak. Where this line intersects the baseline is the extrapolated onset of melting (Tm). This is as described in Bernhard Wunderlich, *The Basis of Thermal Analysis, in Thermal Characterization of Polymeric Materials* 92, 277-278 (Edith A. Turi ed., 2d ed. 1997).

Crystallization temperature, Tc, is determined from a DSC cooling curve as above except the tangent line is drawn on the high temperature side of the crystallization peak. Where this tangent intersects the baseline is the extrapolated onset of crystallization (Tc).

Some embodiments of the present disclosure will now be described in detail in the following Examples.

EXAMPLES

Materials used to produce the primer compositions and articles are provided in Table 1 below.

TABLE 1

Starting materials.

| Component | Specification | Source |
|---|---|---|
| LOTADER ™ AX8900 (EMA/GMA) | ethylene/methyl acrylate/glycidyl methacrylate random terpolymer<br>methyl acrylate content = 24 wt %<br>glycidyl methacrylate content = 8 wt %<br>melt index = 6 g/10 min (190° C./2.16 kg)<br>melting point = 65° C.<br>density = 0.94 g/cc | Arkema |
| LOTADER ™ 4700 (EEA/MAH) | ethylene/ethyl acrylate/maleic anhydride random terpolymer<br>ethyl acrylate content = 29 wt %<br>maleic anhydride content = 1.3 wt %<br>melt index = 7 g/10 min (190° C./2.16 kg)<br>melting point = 65° C.<br>density = 0.94 g/cc | Arkema |
| OREVAC ™ T 9305 (EVA/MAH) | ethylene/vinyl acetate/maleic anhydride random terpolymer<br>vinyl acetate content = 26-30 wt %<br>maleic anhydride content = 0.64 wt %<br>melt index = 150-210 g/10 min (190° C./2.16 kg) | Arkema |

TABLE 1-continued

| Starting materials. | | |
|---|---|---|
| Component | Specification | Source |
| | melting point = 68° C.<br>density = 0.951 g/cc | |
| Michem ™ Prime 4983R (EAA) | aqueous dispersion of ethylene/acrylic acid copolymer<br>non-volatile solids = 24.2-25.4%<br>pH = 8.4-9.4 | Michelman, Inc. |
| HARDLEN ™ F-2P (Cl-PO) | chlorinated polyolefin modified with maleic anhydride<br>chlorine content = 20 wt %<br>solution viscosity = 60 mPa · s (in a 20% toluene solution at 25° C., in accordance with BAM 922) | TOYOBO Co., Ltd. |
| Kraton ™ FG 1901G (MAH-g-SEBS) | maleic anhydride grafted styrene/ethylene butylene/styrene copolymer<br>maleic anhydride content = 1.4-2.0 wt %<br>polystyrene content = 30 wt %<br>melt flow = 22 g/10 min (230° C./5 kg)<br>density = 0.91 g/cc | Kraton |
| HYPOD ™ 1001 (COO-PP) | carboxylated propylene copolymer dispersion in water<br>solids content = 40-44%<br>pH = 9.0-10.5<br>Brookfield Viscosity = <500 cP<br>melting point = 85° C. | The Dow Chemical Company |
| VESTOPLAST ™ W-1750 (APAO) | water-based dispersion of amorphous alpha polyolefin<br>solids content = 47%<br>pH = 9.5<br>Brookfield Viscosity at 20° C. = 450 mPa · s | Evonik Industries |
| DESMODUR ™ RFE (27/73 blend) | polyisocyanate crosslinking agent<br>27 wt % tris (p-isocyanatophenyl) thiophosphate (isocyanate compound)<br>73 wt % ethyl acetate (polar solvent) | Bayer MaterialScience |
| Solvent | toluene | Sigma-Aldrich |
| Solvent | methyl cyclohexane | Sigma-Aldrich |
| Solvent | methyl ethyl ketone | Sigma-Aldrich |
| PET Closed Mesh Fabric Substrate | closed mesh Category 2 architecture fabric, woven Panama weave 2/2 untreated<br>unit weight = 271 g/m$^2$<br>1100 dTex (mass in grams per 10,000 m, yarn specification) | |
| INFUSE ™ 9010 | ethylene/octene multi-block copolymer<br>melt index = 0.50 g/10 min (190° C./2.16 kg)<br>melting point = 122° C.<br>density = 0.879 g/cc<br>Shore A = 77<br>tensile strength at break = ≥13.2 MPa<br>elongation at break = ≥750% | The Dow Chemical Company |
| Magnifin ™ H-5 MV | filler (magnesium hydroxide (MDH))<br>density = 2.4 g/cc | Albemarle |
| Irganox ™ B 225 | Antioxidant blend<br>pentaerythritol tetrakis(3-(3,5-di-tert-butyl-4-hydroxyphenyl)propionate) and tris(2,4-ditert-butylphenyl)phosphite | BASF |
| Chimassorb ™ 2020 | hindered amine light stabilizer (HALS) | BASF |

1. Preparation of Primer Compositions

A given amount of solvent is weighed into a 2 L, 3-necked, round-bottom glass flask in a hood. After attaching a reflux condenser and an over-head mechanical stirrer, ethylene acrylate polymer containing maleic anhydride or glycidyl methacrylate (or comparative polymer) is added to the flask under a slow agitation, to form a primer composition with a solids content of 12-50 wt %. The primer composition is mixed in a Speedy Mixer at a speed of 3000 rpm for 30 seconds at 60° C.

To prepare Example 1A (Ex. 1A) and Comparative Samples 4A, 8A and 9A (CS 4A, CS 8A, and CS 9A) of Table 2, 10 g of the above-made primer composition is weighed into a glass vial. Then, a given amount of a polyisocyanate crosslinking agent (DESMODUR™ RFE) is added and mixed by a spatula for 3 to 5 minutes to make a uniform mixture.

Example 2A (Ex. 2A) and Comparative Samples 3A and 5A-7A (CS3A, and CS5A-CS7A) of Table 2 each is void of a crosslinking agent.

Table 2 provides the formulation for each primer composition.

2. Preparation of Coated Closed Mesh PET Fabric Article

The closed mesh PET fabric roll is inserted into a roller coating line (a KTF-S line from Mathis AG), where the closed mesh PET fabric roll is roller coated with the above-made Example and Comparative Sample primer compositions. The closed mesh PET fabric coated with a primer composition is dried in an oven at 100° C. for three minutes to form an adhesive layer on the closed mesh PET fabric (a PET fabric/adhesive layer structure). The coat weight is measured. A typical coat weight is approximately 10-45 g/m$^2$ (after drying). Only one side of the closed mesh PET fabric is coated. The coat weight of each Example and Comparative Sample adhesive layer (dried primer composition) applied to the closed mesh PET fabric is provided in Table 2.

A control sample (CS10) is prepared without a primer composition on the closed mesh PET fabric.

3. Preparation of Filled Olefin Block Copolymer (OBC)

INFUSE™ 9010 ethylene/octene multi-block copolymer (OBC), Magnifin™ H-5 MV (magnesium hydroxide (MDH)), titanium dioxide ($TiO_2$), Irganox™ B 225, and Chimassorb 2020™ are weighed into a Kraus Maffei twin screw lab line extruder, and blended in the extruder to form a filled OBC composition. The filled OBC composition contains 35 wt % INFUSE™ 9010 OBC, 60 wt % MDH, 0.5 wt % $TiO_2$, 0.2 wt % Irganox™ B 225, and 0.4 wt % Chimassorb 2020.

4. Preparation of PET Fabric/Adhesive Layer/Filled OBC Layer Article

The coated closed mesh PET fabrics prepared as described above are rolled with a Mathis Ag KTF-S automated line. Each rolled coated closed mesh PET fabric is placed in a calendar extrusion line with the extruder containing the filled OBC composition. The filled OBC composition is extruded onto the coating of the coated closed mesh PET fabric at an extrusion temperature of 270° C., to form a PET fabric/adhesive layer/filled OBC layer article. The PET fabric/adhesive layer/filled OBC layer article passes through a series of 3 vertical calendar rolls. After passing through the calendar rolls, the final PET fabric/adhesive layer/filled OBC layer article has a thickness of 1-1.5 mm.

The control sample (CS 10) is prepared without a primer composition on the closed mesh PET fabric.

5. Adhesion Testing—T-Peel Test

The PET fabric/adhesive layer/filled OBC article is cut into "2.45 cm×15.24 cm" strips (each strip had a bond area of "2.45 cm×12.7 cm") and conditioned at 23° C. and a relative humidity of 40% to 50% for 24 hours for the T-peel adhesion test. A TA XT Plus Texture Analyzer from Stable Microsystems is used to peel apart the closed mesh PET fabric and the filled OBC layer at room temperature (23° C.), at speed of 5.08 cm/min, and grip distance of 20 mm. The release liner is removed from each strip, and the free ends of the test sample are inserted into the clamps of the test machine. The average peel strength (Newtons per centimeter (N/cm)) is determined from the force versus distance profile. Two or three test samples are tested and the average "average peel strength" is reported. The adhesion between the closed mesh PET fabric and the filled OBC layer with various primer compositions applied between the closed mesh PET fabric and filled OBC layer is provided in Table 2.

Adhesion is visually rated on a scale of 1 to 4. A rating of 1 indicates the closed mesh PET fabric cannot be separated from the filled OBC layer. A rating of 2 indicates slight separation. A rating of 3 indicates intermediate separation. A rating of 4 indicates the closed mesh PET fabric can be separated from the filled OBC layer with manual (i.e., hand) peeling. Samples with a rating of 1 or 2 meet customer requirements for adhesion (i.e., have a peel strength greater than 12 N/cm), while samples with a rating of 3 or 4 do not meet customer requirements for adhesion (i.e., have a peel strength less than 12 N/cm). Adhesion rating is provided in Table 2.

In Table 2, primer compositions are denoted with the letter "A," closed mesh PET fabrics coated with primer composition and dried (i.e., coated closed mesh PET fabric articles) are denoted with the letter "B," and PET fabric/adhesive layer/filled OBC layer articles formed from filled OBC and the closed mesh PET fabrics coated with primer composition and dried are denoted with the letter "C." By way of explanation, coated closed mesh PET fabric Ex. 1B is coated with primer composition Ex. 1A and dried, and PET fabric/adhesive layer/filled OBC layer article Ex. 1C includes the filled OBC and coated closed mesh PET fabric Ex. 1B—thus, Ex. 1 constitutes Ex. 1A, Ex. 1B, and Ex. 1C.

TABLE 2

| | Primer Compositions and Articles◇ | | | | | | | | | |
|---|---|---|---|---|---|---|---|---|---|---|
| | Ex 1 | Ex 2 | CS 3 | CS 4 | CS 5 | CS 6 | CS 7 | CS 8 | CS 9 | CS 10 |
| | Primer Compositions | | | | | | | | | |
| | Ex 1A | Ex 2A | CS 3A | CS 4A | CS 5A | CS 6A | CS 7A | CS 8A | CS 9A | CS 10A |
| LOTADER ™ AX8900 (EMA/GMA) | 11.7 | — | — | — | — | — | — | — | — | — |
| OREVAC ™ T 9305 (EVA/MAH) | — | 12 | — | — | — | — | — | — | — | — |
| LOTADER ™ 4700 (EEA/MAH) | — | — | 12 | — | — | — | — | — | — | — |
| Michem ™ Prime 4983R (EAA) | — | — | — | — | 25 | — | — | — | — | — |
| HARDLEN ™ F-2P (CI-PO) | — | — | — | 9.75 | — | — | — | 8.55 | 8.55 | — |
| Kraton ™ FG 1901G (MAH-g-SEBS) | — | — | — | 9.75 | — | — | — | 8.55 | 8.55 | — |
| HYPOD ™ 1001 (COO-PP) | — | — | — | — | — | 40 | — | — | — | — |
| VESTOPLAST ™ W-1750 (APAO) | — | — | — | — | — | — | 50 | — | — | — |
| Toluene | 88 | 88 | 88 | — | — | — | | — | — | — |
| Methyl Cyclohexane | — | — | — | 80 | — | — | — | 82 | 82 | — |
| Methyl Ethyl Ketone | — | — | — | — | — | — | — | — | — | — |
| DESMODUR RFE* | 0.3 | — | — | 0.5 | — | — | — | 0.9 | 0.9 | — |
| Total Primer (wt %) | 100 | 100 | 100 | 100 | 100 | 100 | 100 | 100 | 100 | 0 |
| Primer Solids Content (wt %) | 12 | 12 | 12 | 20 | 25 | 40 | 50 | 18 | 18 | N/A |

TABLE 2-continued

| Primer Compositions and Articles◇ | | | | | | | | | | |
|---|---|---|---|---|---|---|---|---|---|---|
| | Ex 1 | Ex 2 | CS 3 | CS 4 | CS 5 | CS 6 | CS 7 | CS 8 | CS 9 | CS 10 |
| Primer Brookfield Viscosity (cP) | 230 | 74 | 240 | 770 | 985 | 460 | 1760 | 780 | 780 | N/A |
| Primer Pot-Life (hours) | >4 | >4 | >4 | <0.5 | >4 | >4 | >4 | 1 | 1 | N/A |
| Coated Closed Mesh PET Fabric | | | | | | | | | | |
| | Ex 1B | Ex 2B | CS 3B | CS 4B | CS 5B | CS 6B | CS 7B | CS 8B | CS 9B | CS 10B |
| Primer Coat Weight after Drying (g/m$^2$) | 10-15 | 10-15 | 10-15 | 15-20 | 20 | 35-45 | 35-45 | 15-20 | 15-20 | N/A |
| PET Fabric/Adhesive Layer/Filled OBC Layer | | | | | | | | | | |
| | Ex 1C | Ex 2C | CS 3C | CS 4C | CS 5C | CS 6C | CS 7C | CS 8C | CS 9C | CS 10C |
| Peel Strength (N/cm) | 16 | 20 | 5 | 18 | 5 | 5 | 5 | 21 | 18 | 5 |
| Adhesive Rating# | 1 | 2 | 4 | 1-2 | 4 | 4 | 4 | 1 | 1 | 4 |

CS = Comparative Sample

N/A = Not Applicable

◇Weight percents are based on the total weight percent of the primer compositions.

*DESMODUR RFE is added as a solution containing 27 wt % tris (p-isocyanatophenyl) thiophosphate and 73 wt % ethyl acetate (a solvent), based on the combined amount of tris (p-isocyanatophenyl) thiophosphate and ethyl acetate components.

#Adhesive Rating is visually determined on a scale of 1 to 4. A rating of 1 indicates the closed mesh PET fabric cannot be separated from the filled OBC layer. A rating of 2 indicates slight separation. A rating of 3 indicates intermediate separation. A rating of 4 indicates the closed mesh PET fabric can be separated from the filled OBC layer with manual (i.e., hand) peeling.

6. Results and Discussion

As shown, halogen-free articles formed from (A) a closed mesh PET fabric, (B) an adhesive layer containing (i) an EVA/MAH terpolymer or (ii) an EMA/GMA terpolymer crosslinked with a polyisocyanate, and (C) an outer layer containing OBC and filler (Ex. 1 and Ex. 2) advantageously exhibit a peel strength of greater than 12 N/cm (Ex. 1 has a peel strength of 16 N/cm and Ex. 2 has a peel strength of 20 N/cm), which is a comparable peel strength (as measured by the T-Peel Test described above) to halogenated articles in which the coating contains a chlorinated polyolefin and a maleic anhydride grafted styrene/ethylene butylene/styrene copolymer (CS 4, CS 8, CS 9).

Moreover, halogen-free articles formed from (A) a closed mesh PET fabric, (B) an adhesive layer containing (i) an EVA/MAH terpolymer or (ii) an EMA/GMA terpolymer crosslinked with a polyisocyanate, and (C) an outer layer containing OBC and filler (Ex. 1 and Ex. 2) advantageously exhibit a peel strength of greater than 12 N/cm (Ex. 1 has a peel strength of 16 N/cm and Ex. 2 has a peel strength of 20 N/cm), which is an improved peel strength over (i.e., higher than) a comparative article in which the coating contains ethylene/acrylic acid copolymer (CS 5, having a peel strength of 5 N/cm), carboxylated propylene copolymer (CS 6, having a peel strength of 5 N/cm), or amorphous alpha polyolefin (CS 7, having a peel strength of 5 N/cm). Further, a comparative article in which the coating contains ethylene/ethyl acrylate/maleic anhydride terpolymer (EEA/MAH terpolymer) (CS 3) exhibits a peel strength of 5 N/cm, which is insufficient to meet industry requirements for adhesion (industry requirements being a peel strength of greater than 12 N/cm). None of CS 3, CS 5, CS 6, CS 7 or CS 10 meet industry requirements for adhesion because they each exhibit a peel strength of less than 12 N/cm.

It is specifically intended that the present disclosure not be limited to the embodiments and illustrations contained herein, but include modified forms of those embodiments including portions of the embodiments and combinations of elements of different embodiments as come within the scope of the following claims.

We claim:

1. An article comprising:

(A) a polyester fabric consisting of polyethylene terephthalate;

(B) an adhesive layer having a coat weight from 10 g/m$^2$ to 40 g/m$^2$, the adhesive layer adhered to the polyethylene terephthalate fabric and comprising components selected from a group consisting of (i) an ethylene/vinyl acetate/maleic anhydride terpolymer, (ii) an ethylene/methyl acrylate/glycidyl methacrylate terpolymer, and (iii) combinations thereof;

(C) an outer layer adhered to the adhesive layer, the outer layer consisting of (i) from 20 wt % to 50 wt % of an ethylene/$\alpha$-olefin multi-block copolymer, (ii) from 50 wt % to 80 wt % of a filler, (iii) from 0 wt % to 3.0 wt % optional additive selected from the group consisting of antioxidant, colorant, ultra violet absorber, ultra violet stabilizer, and combinations thereof, based on the total weight of the outer layer; and the article is halogen-free.

2. The article of claim 1, wherein the polyester fabric is a non-surface-modified, closed mesh polyester polyethylene terephthalate fabric.

3. The article of claim 2, wherein the adhesive layer comprises the ethylene/methyl acrylate/glycidyl methacrylate terpolymer.

4. The article of claim 3, wherein the ethylene/methyl acrylate/glycidyl methacrylate terpolymer comprises from 5 wt % to 10 wt % glycidyl methacrylate, based on the weight of the terpolymer, and the ethylene/methyl acrylate/glycidyl methacrylate terpolymer has a melt index from 1 g/10 min to 15 g/10 min.

5. The article of claim 4, wherein the adhesive layer consists of ethylene/methyl acrylate/glycidyl methacrylate terpolymer crosslinked with a polyisocyanate.

6. The article of claim 5 wherein the polyisocyanate is tris (p-isocyanatophenyl)thiophosphate.

7. The article of claim 1, wherein the adhesive layer consists of the ethylene/vinyl acetate/maleic anhydride terpolymer.

8. The article of claim 7, wherein the ethylene/vinyl acetate/maleic anhydride terpolymer comprises from 0.5 wt % to 3.0 wt % maleic anhydride, based on the weight of the terpolymer.

9. The article of claim 1, wherein the adhesive layer has a coat weight from 10 $g/m^2$ to 15 $g/m^2$.

10. The article of claim 1, wherein the article has a peel strength from 12 N/cm to 50 N/cm.

11. The article of claim 1 wherein the adhesive layer is in direct contact with the fabric layer and the outer layer is in direct contact with the adhesive layer.

12. The article of claim 11 wherein the adhesive layer is a continuous layer, and the outer layer is a continuous layer.

13. The article of claim 12 wherein the adhesive layer is applied to a non-modified surface of the fabric layer and the adhesive layer is further applied to a surface of the outer layer.

14. The article of claim 13 wherein the polyester fabric has a thickness from 100 μm to 3000 μm.

15. The article of claim 1, wherein the adhesive layer comprises 100 wt. % based on the total weight of the adhesive layer of at least one of (i) an ethylene/vinyl acetate/maleic anhydride terpolymer and (ii) an ethylene/methyl acrylate/glycidyl methacrylate terpolymer.

16. The article of claim 15, wherein the adhesive layer comprises 100 wt. % based on the total weight of the adhesive layer of the ethylene/vinyl acetate/maleic anhydride terpolymer.

17. The article of claim 15, wherein the adhesive layer comprises 100 wt. % based on the total weight of the adhesive layer of the ethylene/methyl acrylate/glycidyl methacrylate terpolymer.

18. The article of claim 1, wherein the adhesive layer comprises the ethylene/methyl acrylate/glycidyl methacrylate terpolymer and further comprises from 0.10 wt. % to 15 wt. % based on the total weight of the adhesive layer of a crosslinking agent, and wherein the ethylene/methyl acrylate/glycidyl methacrylate terpolymer and the crosslinking agent amount to 100 wt. % of the adhesive layer.

19. An article comprising:

(A) a fabric in which all the fibers consist of polyethylene terephthalate;

(B) an adhesive layer having a coat weight from 10 $g/m^2$ to 20 $g/m^2$, the adhesive layer directly adhered to the fabric, the adhesive layer consists of (i) one of an ethylene/vinyl acetate/maleic anhydride terpolymer and an ethylene/methyl acrylate/glycidyl methacrylate terpolymer and (ii) an optional crosslinking agent;

(C) an outermost layer directly adhered to the adhesive layer, the outermost layer consisting of (i) from 20 wt % to 50 wt % of an ethylene/α-olefin multi-block copolymer, (ii) from 50 wt % to 80 wt % of a filler, (iii) from 0 wt % to 2.0 wt % optional additive selected from the group consisting of antioxidant, colorant, ultra violet absorber, ultra violet stabilizer, and combinations thereof, based on the total weight of the outermost layer; and the article is halogen-free.

* * * * *